No. 735,193. PATENTED AUG. 4, 1903.
R. ALLERT.
GREASE SEPARATOR.
APPLICATION FILED MAR. 13, 1903.
NO MODEL.
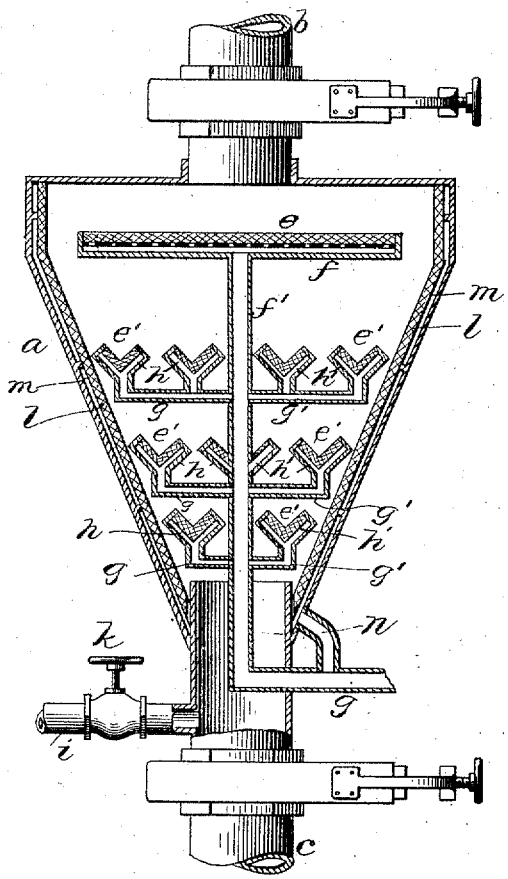
Witnesses
Ernest H. Boise.
M. Hyndman
Inventor
Rudolph Allert
By William R. Baird
His Attorney No. 735,193. Patented August 4, 1903.

UNITED STATES PATENT OFFICE.

RUDOLF ALLERT, OF PHILADELPHIA, PENNSYLVANIA.

GREASE-SEPARATOR.

SPECIFICATION forming part of Letters Patent No. 735,193, dated August 4, 1903.

Application filed March 13, 1903. Serial No. 147,685. (No model.)

*To all whom it may concern:*

Be it known that I, RUDOLF ALLERT, a citizen of the United States, residing at Philadelphia, in the county of Philadelphia and State of Pennsylvania, have invented certain new and useful Improvements in Grease-Separators, of which the following is a specification.

My invention relates to separators for removing oil or grease from fluids, such as exhaust-steam, in which they are carried in suspension, and has for its object to provide improved means whereby to accomplish this purpose by bringing the grease-laden fluid into contact with plates of porous material and then draining the porous material of absorbed oleaginous substances whereby fresh surfaces are constantly presented to the action of the passing fluid.

The subject-matter of this application of which the invention consists is an apparatus by means of which the object is accomplished, said apparatus consisting of a separator which is, in effect, a steam-chamber provided with plates of porous material forming parts of the walls of drainage-chambers and means for draining the porous material and drainage-chambers of the absorbed oil or grease, all as hereinafter fully described and afterward specifically claimed.

The single figure in the drawing represents a separator embodying my invention in central longitudinal section.

Referring to the drawing by letters, $a$ is a chamber, made of any suitable size and material and provided with a suitable steam-inlet pipe $b$ and outlet-pipe $c$, each pipe being controlled by valves. (Not shown.) Within the chamber are arranged baffle-plates $e\ e'$, of porous material, such as earthenware or baked clay, the plate $e$ forming the closure of the open top of a pan-like drainage-chamber $f$, from which leads downward a central pipe or tube $f'$, leading, by means of a drainage-pipe $g$, to the outside of the steam-chamber, the drainage-chamber being steam-tight, except through the porous plate $e$ and the drainage-pipe provided with a valve. (Not shown.) Into the central pipe $f'$ lead branches $g\ g'$ from supplementary drainage-chambers $h\ h'$, each steam-tight, except that their tops are open and closed by means of the porous plates or material $e'$. The outlet-pipe $c$ is provided with a side-track pipe $i$ and valve $k$. The steam-chamber may also be provided with a porous lining, as at $l$, spaced away from the walls of the chamber, leaving a jacket-like drainage-chamber $m$, communicating, by means of a pipe $n$, with the drainage-pipe $g$.

The operation of my device is as follows: The grease-laden steam is let into the chamber $a$ through the pipe $b$, its valve being open for that purpose. The outlet-pipe $c$ is closed, and the valve $k$ of the side-track pipe $i$ is open. This draws a current of steam through the apparatus for the purpose of heating the baffle-plates to prevent the subsequent condensation of moisture thereon. After this operation has continued until the plates are sufficiently heated the valve $k$ is closed, and the valve of the outlet-pipe and the valve of the drainage-pipe are opened. The drainage-pipe, it will be observed, communicates with the outer air. The pressure on the reverse side of the baffle-plates will be lower on this account than that on the upper side against which the steam impinges. This difference in pressure insures the constant passage of the absorbed oil through the baffle-plates. If, however, this difference in pressure should not be sufficient, the pipe $g$ may be connected with a vacuum-pump or similar means for lessening the pressure within the drainage-chambers. The grease or oil deposited on the plates is absorbed thereby, is forced through the plates by the differences of pressure, collects within the drainage-chamber, and is subsequently removed through the pipes $g$. In its passage through the porous material the oil is filtered and purified, and can again be used for many purposes, the operation of the separator thus accomplishing the manifold result of clearing the exhaust-steam of oily substances and purifying and saving such oily substances, which might otherwise be wasted.

I do not care to limit myself specifically to the use of a porus material like earthenware. Any material having similar properties—as, for instance, charcoal, coke, asbestos, felt, &c.—may be employed with results depending upon the efficiency of the particular absorbing medium used.

This device is very efficient and takes out practically all of the oil from exhaust-steam and may be used for the removal of oily material from ammonia or other fluid with equal success.

Having thus fully described my invention, what I claim as new, and desire to secure by Letters Patent of the United States, is—

1. In a grease-separator for exhaust-steam and the like, the combination with a steam-chamber, a steam-inlet, a steam-outlet, and a drainage-pipe, of a drainage-chamber comprising a main upper chamber and smaller branch chambers, each open at the top but otherwise steam-tight, and all communicating with the drainage-pipe, and porous plates closing the open ends of the main and branch drainage-chambers, substantially as described.

2. In a grease-separator for exhaust-steam and the like, the combination with a steam-chamber, a steam-inlet, a steam-outlet and a drainage-pipe, of a vertical tube in the chamber communicating with the drainage-pipe at its lower end, a top pan-like drainage-chamber at the upper end of and horizontal branches from the sides of the vertical tube, smaller drainage-chambers having open tops and communicating with the horizontal branches, and porous plates closing the pan-like and smaller drainage-chambers, substantially as described.

3. In a grease-separator for exhaust-steam and the like, the combination with a steam-chamber, a steam-inlet pipe, and a steam-outlet pipe, of a pan-like drainage-chamber within the steam-chamber having an open top, but otherwise steam-tight and communicating with the drainage-pipe, a porous plate closing said top, a lining of porous material in the steam-chamber spaced away from the walls thereof to form an intervening drainage-chamber, and communications between said intervening chamber and the drainage-pipe, substantially as described.

Witness my hand this 5th day of March, 1903, at Philadelphia and State of Pennsylvania.

RUDOLF ALLERT.

In presence of—
JOSIE ALLERT,
JOHN H. ROYER.